United States Patent
Kagata

[11] 3,906,812
[45] Sept. 23, 1975

[54] LOCKING DIFFERENTIAL
[75] Inventor: Tooru Kagata, Toyoto, Japan
[73] Assignee: Aisin Seiki Kabushiki Kaisha, Toyoto, Japan
[22] Filed: Mar. 14, 1974
[21] Appl. No.: 451,211

[30] Foreign Application Priority Data
Mar. 31, 1973 Japan.............................. 48-36873
Mar. 31, 1973 Japan.............................. 48-36874
Oct. 12, 1973 Japan............................. 48-114987

[52] U.S. Cl............................................... 74/711
[51] Int. Cl.²......................................... F16H 1/44
[58] Field of Search....................................... 74/711

[56] References Cited
UNITED STATES PATENTS
| | | | |
|---|---|---|---|
| 3,264,901 | 8/1966 | Ferbitz et al............................ | 74/711 |
| 3,362,258 | 1/1968 | Thornton............................... | 74/711 |
| 3,523,467 | 8/1970 | Shachter................................ | 74/711 |
| 3,581,601 | 6/1971 | Kitano .................................. | 74/711 |
| 3,650,349 | 3/1972 | Cleveland et al.................. | 74/711 X |
| 3,791,237 | 2/1974 | Kitano et al.......................... | 74/711 |
| 3,837,236 | 9/1974 | Kagata.................................. | 74/711 |

FOREIGN PATENTS OR APPLICATIONS
35,800    3/1954   Poland................................. 74/711

Primary Examiner—Benjamin W. Wyche
Assistant Examiner—Lance W. Chandler
Attorney, Agent, or Firm—Pierce, Scheffler & Parker

[57] ABSTRACT

A locking differential applicable to a vehicle in which the relative rotation between a pair of side gears connected respectively to the corresponding wheels of the vehicle is regulated by a pair of clutch means which are allowed to create their locking function by frictional resistance forces produced at the clutch means under the relative rotation, wherein a pair of spring means are respectively disposed between each of said clutch means and respective inner ends of a case for biasing all of clutch plates to attain said locking function and for being biased back in the opposite direction by each thrust portion of said side gears upon thrust force thereof being increased, whereby said locking function is kept cancelled during the vehicle running in normal condition.

13 Claims, 11 Drawing Figures

LOCKING DIFFERENTIAL

BACKGROUND OF THE INVENTION

1. Field of the Invention

The present invention relates to improvements in a locking differential particularly adapted for use with motor vehicles.

2. Description of the Prior Art

Conventionally, this type of locking differential has had a drawback that it easily permits reckless operation of the locking function and, thereby, causes blind locking of a side gear upon turning of the vehicle, followed with impediment against proper operation of a differential gear and generation of chatter.

SUMMARY OF THE INVENTION

Therefore, it is an object of the present invention to provide an improved locking differential for obviating the above-mentioned disadvantages.

It is another object of the present invention to provide an improved locking differential wherein clutch diameter of the present device may be enlarged.

It is a further object of the present invention to provide an improved locking differential wherein the present device may be manufactured easily and in compact.

It is still further object of the present invention to provide an improved locking differential wherein excessive friction between spring means and side gears of the present device may be obviated.

The foregoing and other objects are attained according to the present invention through the provision of an improved locking differential wherein a pair of spring means are respectively disposed between each of clutch means and respective inner ends of a case body for biasing all of clutch plates to attain the locking function and for being biased back in the opposite direction by each thrust portion of side gears upon thrust force thereof being increased.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the figures, and wherein.

DETAILED DESCRIPTION OF THE INVENTION

Figure 1:
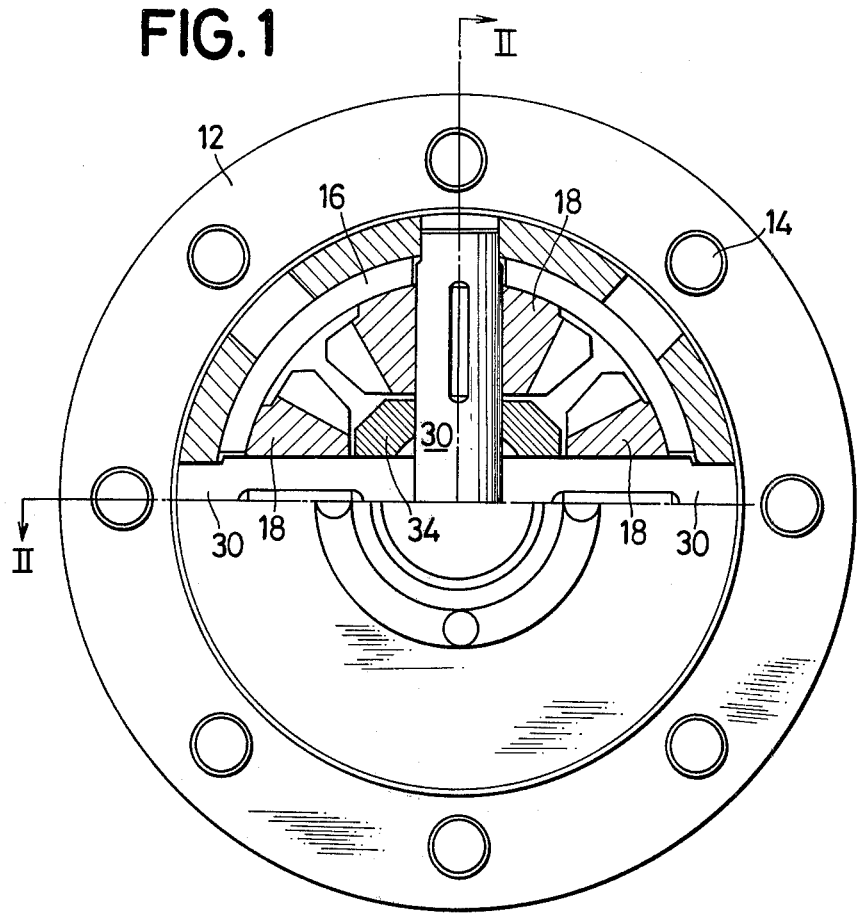
FIG. 1 is a front view of the first embodiment of the present invention, with parts being shown in cross-section taken along the line I—I of FIG. 2.
Figure 2:
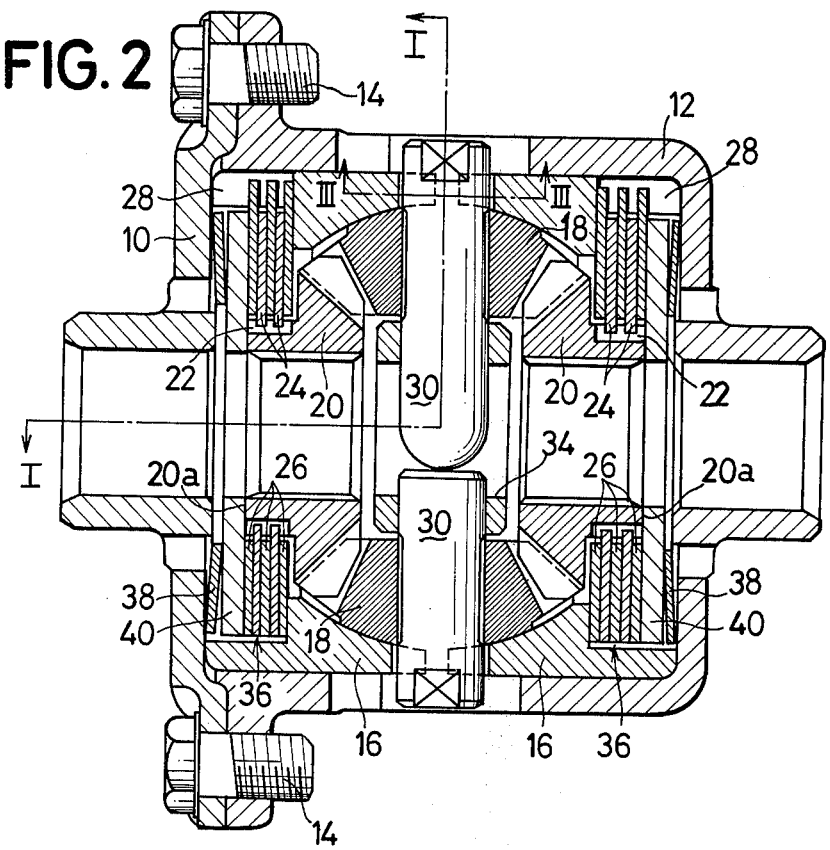
FIG. 2 is a cross-section view taken along the line II—II of FIG. 1.
Figure 3:
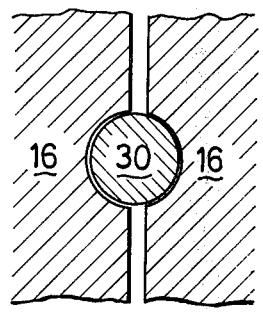
FIG. 3 is a cross-section view taken along the line III—III of FIG. 2.

Referring now to FIGS. 1, 2 and 3, wherein the first embodiment of the present invention is illustrated, a cover 10 is secured to a case 12 by bolts 14. A ring gear mechanically and operatively connected through a drive shaft, a propellar shaft and a transmission to an engine of the vehicle or power source, all of these not being shown, is also secured to the case 12. A pair of collars 16 are positioned symmetrically with each other in the case 12, and outer surfaces of said collars 16 are kept in slide contact with inner surfaces of the case 12 and the cover 10. The numeral 30 denotes pinion shafts fixed to the case 12 at respective ends of the shafts by conventional securing means, supported by a block 34 at the other ends thereof and held between semi-circular notches formed respectively on said pair of collars, as viewed in FIG. 3. Two pairs of pinion gears 18 are rotatably positioned respectively on pinion shafts 30, and spherical outer surfaces of said pinion gears are slidably supported by spherical inner surfaces of said collars 16. A pair of side gears 20, positioned in engagement with said pinion gears 18, are provided with a plurality of splines formed respectively on the inner peripheries thereof for respective splined engagement with suitable axle shaft, not shown, being operatively connected to wheels, also not shown, of the vehicle.

A clutch assembly 36 is disposed between the cover 10 and one of the collars 16 and a further clutch assembly 36 is disposed between the case 12 and the other collar 16. The Clutch assemblies 36 comprise a plurality of inner clutch plates 24 being respectively keyed to the side gears 20 wherein the inner clutch plates 24 have inwardly extending lugs axially slidably engaged with splines 22 formed on the outer peripheries of the hubs of the side gears 20. The clutch assemblies 36 further comprise a plurality of outer clutch plates 26 disposed respectively between the inner clutch plates 24 and the cover 10 (or the case 12), between the inner clutch plates 24 and the collar 16. The outer clutch plates 26 have outwardly extending lugs which are axially slidably disposed in grooves 28 formed on the collars 16 so that the outer clutch plates 26 are keyed to the collars 16. A pressure plate 40 is loosely mounted on the axle shaft between the cover 10 and the left side one of the outer clutch plates 26 and a further pressure plate 40 is loosely mounted on the axle shaft between the case 12 and the right side one of the outer clutch plates 26, as viewed in FIG. 2, and a dish spring 38 is further disposed between said each pressure plate 40 and the cover 10 or the case 12. Therefore, the inner clutch plates 24 and the outer clutch plates 26 are pre-loaded against the collars 16 under the action of dish springs 38. And, one of prominent features of the present device is that thrust end 20a of each side gear 20 is kept in contact with inner periphery of each disc-shaped pressure plate 40.

In operation, when the vehicle is going forward, the drive torque from the engine or the power source is transmitted to the axle shafts through the ring gear, the case 12, pinion shafts 30, pinion gears 18 and side gears 20. When the vehicle is running on normally conditioned road, the torque transmitted to the axle shafts keeps large. It means that the bevel gear thrust generated upon the torque transmission from the pinion gears 18 to the side gears 20 is also large, thereby, each side gear 20 comes to be forced outwards in FIG. 2. In consequence, the thrust end 20a of the side gears 20 arranged to urge each pressure plate 40 outwards is so large that it is to overcome the spring load of the dish springs 38 and thrust them to the inner surfaces of the cover 10 and the case 12, respectively. Therefore, the biasing force of each dish spring 38 loaded upon each clutch assembly 36 is released, followed by further releasing of the frictional resistance between clutch plates 24 and 26, thereby, the locking function of each side gear 20 will be cancelled. Namely, as each side gear 20 doesn't suffer from the locking performed by each clutch assembly 36 upon the vehicle running on normally conditioned road, the differential gear keeps its normal operation without any impediment. Even when the vehicle is in a turn, the differential function is being normally kept without blind locking of each side gear 20, thereby prevent the generation of chatter.

When one wheel of the vehicle is on a road surface which offers comparatively little frictional resistance between the wheel and the road surface, as when the one wheel sinks in mud, it is scarcely possible that the one wheel receives any frictional torque or reaction force, from the road. Therefore, there is little tractive force for drawing the vehicle, whereby the one wheel will be raced, and while the other wheel is capable of receiving frictional torque or reaction force, from the road, the vehicle however, will not be advanced because the one wheel is being raced. At the same time, however, the torque, transmitted from one of the pinion gears 18 to the side gear 20 operatively coupled to said racing wheel, is reduced, thereby the side gear thrust force generated between said both gears 18 and 20 is decreased to be overcome by the spring load of the dish spring 38, and said spring load comes to urge the clutch assembly 36 against the collar 16 for the engagement. Therefore, the required frictional resistance force between the inner clutch plates 24 and the outer clutch plates 26 will be produced so that the clutch assembly 36 creates its locking function, thereby the racing of the side gear 20 will be restricted or locked. Accordingly, the torque, transmitted to another side gear 20 operatively coupled to said the other wheel, acts as the tractive force for moving the vehicle out of, for instance, mud.

Further, according to the present invention, as the collars 16 are blocks separately formed to the case 12 and act as stoppers against the spring load of the dish spring 38 and as receiving supporters for the pinion gears 18, clutch diameter of each clutch assembly 36 may be enlarged within rather limited space of the present device.

Figure 4:
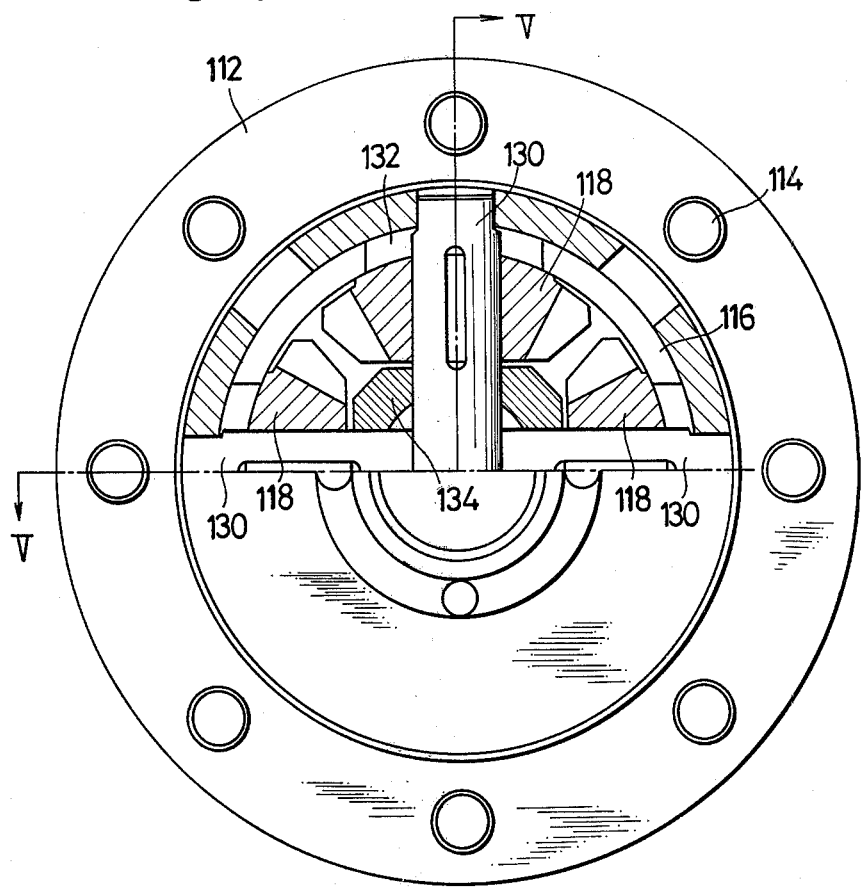
FIG. 4 is a front view of the second embodiment of the present invention, with parts being shown in cross-section taken along the line IV—IV of FIG. 5.
Figure 5:
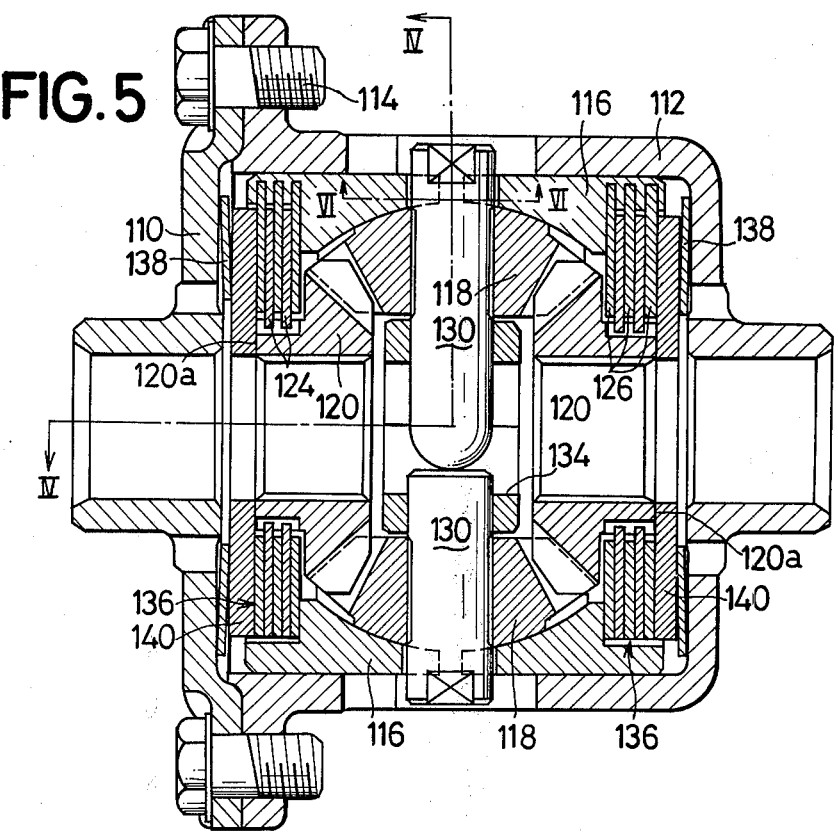
FIG. 5 is a cross-section view taken along the line V—V of FIG. 4.
Figure 6:
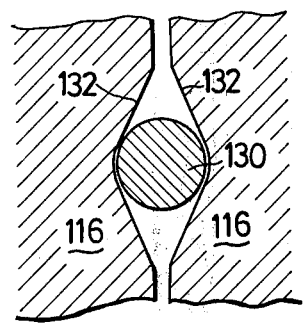
FIG. 6 is a cross-section view taken along the line VI—VI of FIG. 5.
Figure 7:
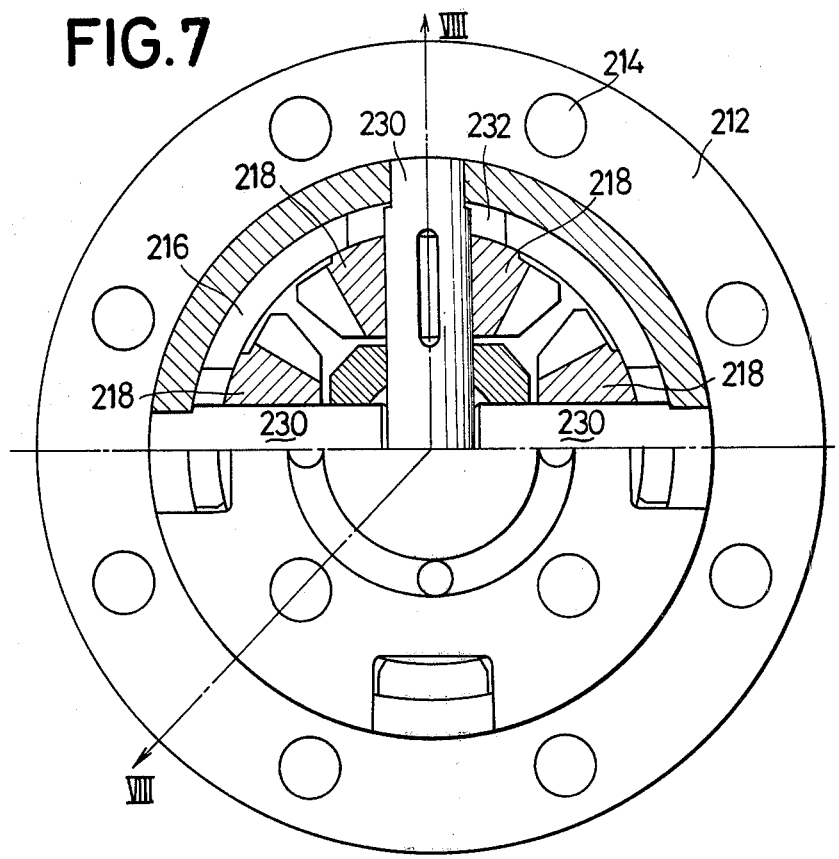
FIG. 7 is a front view of the third embodiment of the present invention, with parts being shown in cross-section taken along the line VII—VII of FIG. 8.
Figure 9:
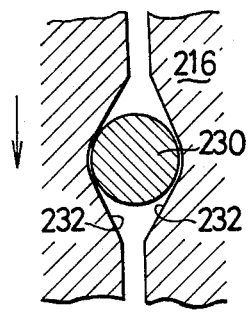
FIG. 9 is a cross-section view taken along the line IX—IX of FIG. 8.

Another embodiment of the present invention is shown in FIGS. 4 to 6, wherein the difference to the foregoing embodiment is found in that a pair of cylindrical collars 116 are disposed within a case 112 and a cover 110 slidably not only circumferentially but axially because a clearance is left between axial one end of one collar 116 and the cover 110 and axial one end of the other collar 116 and the case 112, as viewed in FIG. 5, and in that the collars 116 include axially extending flanges at opposite ends of which are formed cam surfaces 132 engaged with pinion shafts 130, as viewed in FIG. 6.

In operation, when one wheel of the vehicle is on a road surface which offers comparatively little frictional resistance between the wheel and the road surface, as when the one wheel sinks in mud and it is scarcely possible that the one wheel receives any frictional torque or reaction force from the road, the one wheel will be raced together with reduced torque transmitted from one of the pinion gears 118 to the side gear 120 operatively coupled to said racing wheel. At this time, as explained in the foregoing embodiment, the side gear thrust force generated between said both gears 118 and 120 is decreased to be overcome by the spring load of a dish spring 138, and said spring load comes to urge the clutch assembly 136 against the collar 116 for the engagement, so that the clutch assembly 136 creates its locking function. In consequence, the collars 116 receive the frictional resistance force from the clutch assemblies 136 while the pinion shafts 130 tends to rotate with the case 112. Accordingly, relative rotation between the collars 116 and the pinion shafts 130 will occur so that, as supposingly seen in FIG. 6, cam action will be attained between cam surfaces 132 of the collars 116 and the pinion shafts 130. This action spreads the collars 116 from the neutral position shown in FIG. 6 to the respective locked positions against the clutch assemblies 136. By instantaneous repetition of these movements of the collars 116, the frictional resistance forces between the inner clutch plates 124 and the outer clutch plates 126 will be further increased.

As will be evident from the foregoing, the wheel operatively connected to the raced side gear 116 tends to rotate with the case 112 while the other wheel operatively connected to the other side gear 116 tends to be driven by the torque transmitted from the case 112, whereby the vehicle can start to move. Further, as the thrust force against the clutch assembly is increased by the cam action, the spring load of the dish spring and the size thereof may be designed in small, which permit the present device to be designed in compact.

Figure 10:
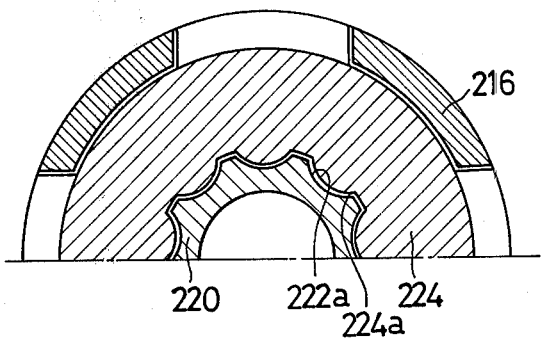
FIG. 10 is a cross-section view taken along the line X—X of FIG. 8.
Figure 8:
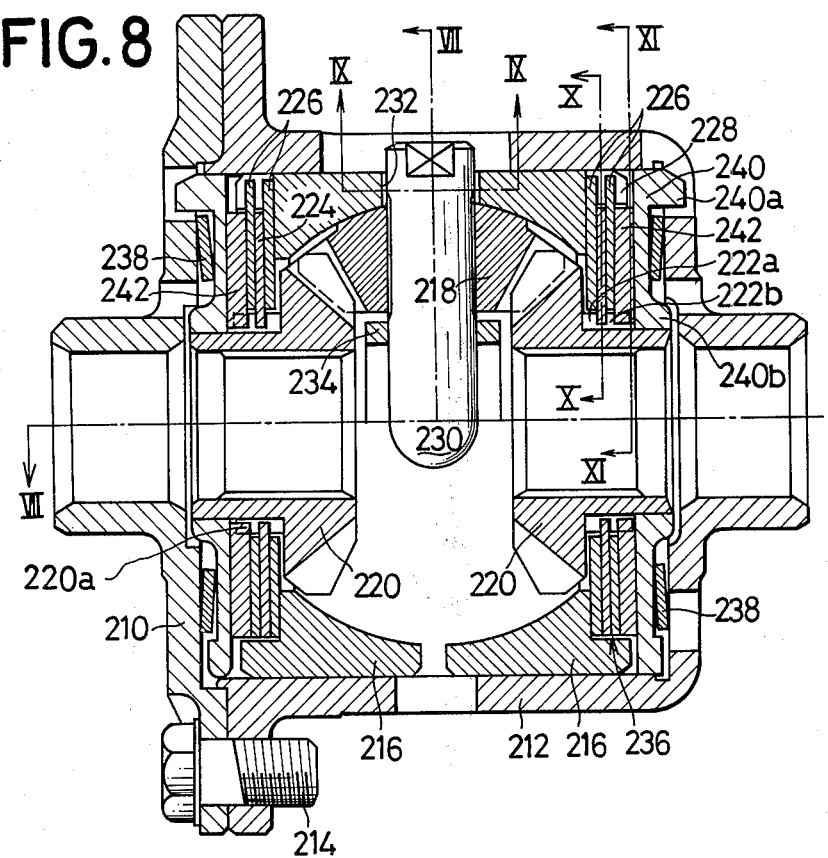
FIG. 8 is a cross-section view taken along the line VIII—VIII of FIG. 7.
Figure 11:
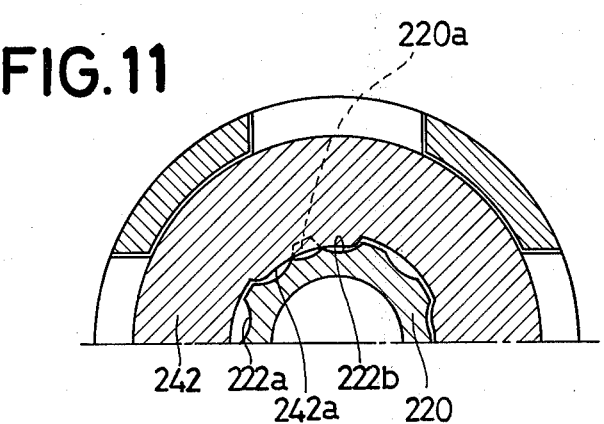
FIG. 11 is a cross-section view taken along the line XI—XI of FIG. 8.

A further embodiment of the present invention is shown in FIGS. 7 to 11, wherein the difference to the foregoing embodiments is found in that a pair of inner clutch plates 224 are respectively disposed between outer clutch plates 226 of each pair assembly 236 and axially slidably mounted on each side gear 220 with inner end flanges 224a thereof being adapted in the corresponding splines 222a formed on outer periphery of a hub portion of each side gear 220, as viewed in FIG. 10, and in that a pair of first pressure plates 242 axially slidably mounted respectively on side gears 220 with inner end flanges 242a being adapted for the corresponding splines 222b formed on outer periphery of the hub portion of each side gear 220, as viewed in FIG. 11. A paiar of second pressure plates 240 are respectively disposed between one of said first pressure plate 242 and a cover 210 and another first pressure plate 240 and the case 212. Said each second pressure plate 240 is axially slidably mounted on the side gear 220 being provided with an outer projection 240a loosely projected through a cut-away window formed in the cover 210 and the case 212, respectively, and an inner projection 240b by inner periphery of which the side gear 220 is slidably supported. A pair of dish springs 238 are respectively disposed between one of the second pressure plates 240 and the cover 210 and another second pressure plate 240 and the case 212. Said each dish spring 238 is pre-loaded to biase each clutch assembly 236 against each collar 216 through the second and the first pressure plates 240 and 242, thereby restrict or lock the relative rotation of the side gear 220 and the collar 216.

In operation, when the vehicle is running on normally conditioned road, the torque transmitted from the engine is large, whereby rather large thrust force of side gears 220 will be generated when said torque is transmitted from the case 212 to the side gears 220 through pinion shafts 230 and pinion gears 218. Accordingly, each first pressure plate 242 will be thrusted outward by axial ends 220a of the splines 222b of respective side gears 220, thereby each dish spring 238 will be biased back outwardly through each second pressure plate 240, which permit each clutch assembly 236 to be released. When one wheel of the vehicle is on a road surface which offers comparatively little frictional resistance between the wheel and the road surface, as when the one wheel sinks in mud and it is scarcely possible that the one wheel receives any frictional torque or reaction force from the road, the one wheel will be raced together with reduced torque transmitted from one of the pinion gears 218 to the side gear 220 operatively coupled to said racing wheel. At this instance, as is explained in the foregoing embodiments, the side gear thrust force generated between said both gears 218 and 220 is decreased to be overcome by the spring load of the dish spring 238, and said spring load comes to force the second pressure plate 240, the first pressure plate 242 and the outer clutch plates 226 and the inner clutch plate 224 against the collar 216, so that the clutch assembly 236 creates its locking function.

As is evident from the foregoing, when the side gear thrust is transmitted to the dish springs 238, there is generated no friction between axial ends of the splines 222b and the first pressure plates 242 because said first pressure plates 242 are circumferentially fixed to the side gears 220. The friction is to be generated between each flat surface of the first pressure plates 242 and the second pressure plates 240. Therefore, frictional resistance per area is maintained very low compared with the foregoing embodiments, which permits the present device to be durable on the frictional portion and ensured in the transmission of the thrust force from the side gears. Further, the differentially stepped splines formed on the outer periphery of the side gears are easy to be processed.

Various other modifications and variations of the present invention are obviously possible in light of the above teachings. It is to be understood therefore, that within the scope of the appended claims, the invention may be practiced otherwise than as specifically described herein.

What I claim is:

1. A locking differential for receiving torque from a power source and delivering it to two separate coaxial output axle shafts comprising:
   a rotatable case driven by said power source;
   a pair of axially separated side gears disposed inside said case and mounted on said axle shafts respectively, for drive connection therewith;
   pinion shaft means disposed between said side gears and rotatable with said case;
   a plurality of pinion gears disposed inside said case and in engagement with said side gears to provide a differential gearing, said pinion gears being mounted for free rotation on said pinion shaft means;
   a pair of axially separated collar means respectively disposed outside said pinion gears and being axially movable with respect to said axle shafts, each of said collar means being rotatably engageable with said pinion shaft means;
   a pair of clutch means disposed in said case, each of said clutch means comprising at least one first clutch plate operatively and directly connected with each of said side gears and at least one second clutch plate operatively and directly connected with each of said collar means and movable therewith, thereby to create a locking function by a frictional resistance force produced upon relative rotation of said side gears;
   a pair of biasing means respectively disposed inside said case for compressing said clutch means to increase the frictional resistance force; and
   a pair of release means respectively interposed between said biasing means and said clutch means and being biased toward said case by said side gear to release said clutch means when thrust force of said side gear is increased.

2. A locking differential as set forth in claim 1, wherein each of said side gears is formed with an axially outwardly extending means on the axle shaft for operatively and directly connecting said first clutch plate of each clutch means and permitting the same to move axially thereon.

3. A locking differential as set forth in claim 2, wherein each of said collar means is formed with an axially outwardly projecting means for operatively and directly connecting said second clutch plate of each clutch means and permitting the same to move axially thereon.

4. A locking differential as set forth in claim 3 wherein each of said release means constitutes a pressure plate loosely mounted on the axle shaft thereby to contact each end of said extending means.

5. A locking differential as set forth in claim 3 wherein each of said release means is operatively connected with each of said extending means.

6. A locking differential as set forth in claim 5 wherein at least a circumferentially stepped and axially spaced spline is formed on an outer periphery of each of said extending means for adapting therein said first clutch plate and said release means, respectively, whereby said release means is axially movable independently of said first clutch plate upon an axial movement of each side gear.

7. A locking differential as set forth in claim 5 wherein said release means constitutes a first pressure plate and a second pressure plate.

8. A locking differential as set forth in claim 7, wherein each of said extending means is provided with a second axially outwardly extending means on an outer periphery thereof, each of said second extending means being formed with at least a circumferentially stepped and axially spaced spline on an outer periphery thereof for adapting therein said first clutch plate and said first pressure plate, respectively, said second pressure plate being loosely mounted on said extending means.

9. A locking differential as set forth in claim 6, wherein said extending means is provided with a second axially outwardly extending means formed with at least an axially extending spline thereon, said first clutch plate being adapted in said axially extending spline and said release means being loosely mounted on said extending means.

10. A locking differential as set forth in claim 4, wherein cam means is arranged between each of said collar means and said pinion shaft means for causing said collar means to move toward said clutch means upon the relative rotation of said collar means and said pinion shaft means.

11. A locking differential as set forth in claim 5, wherein cam means is arranged between each of said collar means and said pinion shaft means for causing said collar means to move towards said clutch means upon the relative rotation of said collar means and said pinion shaft means.

12. A locking differential as set forth in claim 1 wherein said biasing means is a dish spring.

13. A locking differential as set forth in claim 1 wherein cam means is arranged between each of said collar means and said pinion shaft means for causing said collar means to move towards said clutch means upon the relative rotation of said collar means and said pinion shaft means.

* * * * *